United States Patent [19]

Tokuda

[11] 4,206,998
[45] Jun. 10, 1980

[54] EXPOSURE CONTROL METHOD FOR AN AUTOMATIC COLOR PRINTER WITH SLOPE CONTROL

[75] Inventor: Kanji Tokuda, Minami-ashigara, Japan

[73] Assignee: Fuji Photo Film Co., Ltd., Minami-ashigara, Japan

[21] Appl. No.: 940,019

[22] Filed: Sep. 6, 1978

Related U.S. Application Data

[63] Continuation of Ser. No. 732,663, Oct. 15, 1976.

[30] Foreign Application Priority Data

Oct. 17, 1975 [JP] Japan .................... 50/125163

[51] Int. Cl.² .................................. G03B 27/78
[52] U.S. Cl. ............................. 355/77; 355/38
[58] Field of Search ................ 355/77, 35–38, 355/67–71, 88, 132; 354/24; 356/443, 444

[56] References Cited

U.S. PATENT DOCUMENTS

| 2,995,978 | 8/1961 | Glandon et al. | 355/68 |
| 3,482,916 | 12/1969 | Mey et al. | 355/38 |
| 3,873,199 | 3/1975 | Weinert | 355/38 |
| 3,936,842 | 2/1976 | Nanba et al. | 354/24 |

FOREIGN PATENT DOCUMENTS 1016561  1/1966  United Kingdom.

Primary Examiner—L. T. Hix
Assistant Examiner—W. J. Brady
Attorney, Agent, or Firm—Fleit & Jacobson

[57] ABSTRACT

The density of a negative is measured by a photocell and log converted through a log conversion amplifier. The log converted density is then converted with a properly selected gain to a value suitable for slope control. The converted value is exponential converted to a value indicative of the amount of the light transmitting through the negative. The exponential converted value is integrated to be compared with a preselected value to determine the exposure time.

1 Claim, 6 Drawing Figures

DENSITY OF NEGATIVE

EXPOSURE CONTROL METHOD FOR AN AUTOMATIC COLOR PRINTER WITH SLOPE CONTROL

This is a continuation of application Ser. No. 732,663, filed Oct. 15, 1976.

BACKGROUND OF THE INVENTION

1. Field of the Invention

This invention relates to an exposure control method in an automatic color printer, and more particularly to a method of controlling exposure in an automatic color printer which adopts a gray integration printing method wherein slope control is improved.

2. Description of the Prior Art

In an automatic color printer in which the exposure is controlled in accordance with a gray integration printing method based on LATD (Large Area Transmittance Density), the density and color balance of a printed photograph change as the density of the original negative changes. In other words, even if the same subject is photographed, the density and the color balance of the photograph printed by the printer change as the density of the original negative changes. This is considered to be caused by the reciprocity law failure of the photographic paper, the difference between the spectroscopic sensitivity of the photographic paper and that of the printer, and the reciprocity law failure of the electric circuit employed in the printer and so forth.

In order to correct the change in density and color balance as mentioned above, a slope control is performed. The slope control is a process employed in the color printer by which the slope of a curve in a graph having a scale of LATD on the abscissa and exposure time on the ordinate is changed of its gradient in order to obtain a color print of constant density and color balance with negatives of different density.

It has been known in the art to perform the slope control in an automatic color printer. In the conventional color printer with the slope control system, the exposure time is corrected with reference to the density of the negative by use of a capacitor connected in series with a photodetector which measures the density of the negative. The exposure time is elongated when the negative is of over exposure, and is shortened when it is of under exposure.

The above-described conventional color printer with the slope control system has a defect in that the linearity of the slope control (the relationship between the density of the negative and the log of the exposure time) is low since the slope control system utilizes the characteristic of charging and discharging of a capacitor. Further, since the slope control system is combined with an exposure control circuit in the conventional color printer, there is also a defect in that the slope control system and the exposure control circuit affect each other.

SUMMARY OF THE INVENTION

It is the primary object of the present invention to provide a method of controlling exposure in a color printer wherein the slope control is performed independently of the exposure control.

It is another object of the present invention to provide a method of controlling exposure in a color printer wherein the slope control can be performed with high linearity.

It is a further object of the present invention to provide a method of controlling exposure in a color printer wherein the slope control can be performed with various linear relationships of the log exposure time and the density of the negative.

The above objects are accomplished by measuring the density of the negative, log converting the density, converting the density to a value suitable for slope control, exponential converting the value, integrating the exponential value, and comparing the integrated value with a predetermined value to determine the exposure time. The conversion of the log density to the value for slope control can be conducted by various electric converting circuits, and the function of the conversion can be freely selected.

DESCRIPTION OF THE PREFERRED EMBODIMENTS

Figure 1:
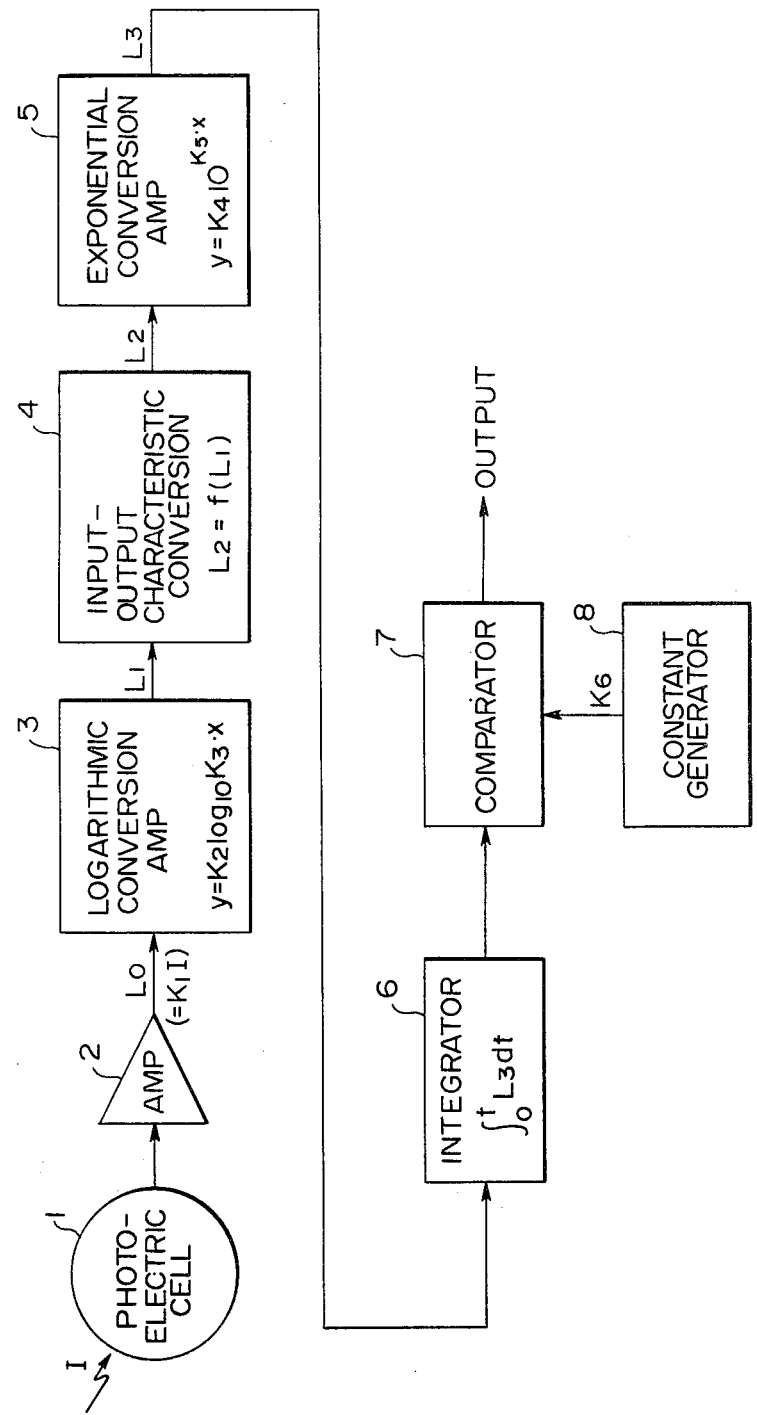
FIG. 1 is a block diagram showing an electric circuit system which embodies the method in accordance with the present invention.

An electric circuit system employed in an exposure control device which embodies the exposure control method in accordance with the present invention is shown in FIG. 1. The circuit system is comprised of a photoelectric cell 1 which receives light transmitted through a negative film used for printing a color photograph, an amplifier 2 connected with the output of the photoelectric cell 1, a logarithmic conversion amplifier 3 connected with the output of the amplifier 2, an input-output conversion circuit 4 connected with the output of the log conversion amplifier 3, an exponential conversion amplifier 5 connected with the output of the input-output conversion circuit 4, an integrater 6 connected with the output of the exponential conversion amplifier 5, a comparator 7 connected with the output of the integrator 6, and a constant generator 8 connected with the comparator 7 for giving the same a constant to be compared with the output from the integrator 6 therein.

The photoelectric cell 1 measures the amount of light transmitted through a negative and accordingly gives an output indicative of the density of the negative (not shown). The output is log converted through the log conversion amplifier 3. The output of the log conversion amplifier 3 is suitably converted to a value through the input-output conversion circuit 4 so that the density of the negative is converted to a value for performing the slope control. The output of the conversion circuit 4 is exponential converted through the exponential conversion amplifier 5 so that the output of the latter may be used for controlling the exposure time of a printer.

In the above described circuit system, the input-output conversion circuit 4 operates to convert the density to a value for exposure time. Therefore, by properly selecting the function of conversion thereby, various relationships between the density and the exposure time can be obtained to perform the slope control. The operation thereof and some embodiments thereof will now be described in detail with respect to one color. In practice, the same operation is conducted with respect to all separated colors to perform the slope control.

The relations of the input and output of the log conversion amplifier 3 and the exponential conversion amplifier 5 are represented by the following formulae, where the input is represented by x and the output by y.

$$y = K_2 \log_{10} K_3 \cdot x \qquad (1)$$

$$y = K_4 10^{K_5 \cdot x} \qquad (2)$$

In the above formulae (1) and (2), $K_2$, $K_3$, $K_4$ and $K_5$ are all constants.

Where the various signals, outputs and constants are represented as below, the operation of the circuit system shown in FIG. 1 can be represented as follows.

$I_0$: amount of light incident to the nagative
$I$: amount of light transmitting through the negative
$D$: density of the negative (LATD)
$T$: exposure time determined by the circuit system
$L_1$: output of the log conversion amplifier 3
$L_2$: output of the input-output conversion circuit 4
$L_3$: output of the exponential conversion amplifier 5
$K_6$: constant given by the contant generator 8
$L_0$: input of the log conversion amplifier 3

The density of the negative D can be represented by $$D = -\log_{10}(I/I_0).$$

Therefore, the following formula is obtained.

$$I = I_0 \cdot 10^{-D} \qquad (3)$$

The input $L_0$ of the log conversion amplifier 3 is represented by the following formula since it is in proportion to the amount of light transmitting through the negative I. ($K_1$: constant)

$$L_0 = K_1 I = K_1 I_0 \cdot 10^{-D}$$

Accordingly, the output of the log conversion amplifier 3 is represented by the formula, $$L_1 = K_2 \log_{10} K_3 L_0 = K_2 \log_{10} K_3 K_1 I \qquad (4)$$

The conversion operation of the input-output conversion circuit 4 is represented by the formula, $$L_2 = f(L_1) \qquad (5)$$

and accordingly, the output $L_3$ of the exponential conversion amplifier 5 can be represented by the following formula by use of formula (2).

$$L_3 = K_4 10^{K_5 \cdot L_2} = K_4 \cdot 10^{K_5 f(L_1)}$$

By integrating the output $L_3$ with the integrator 6 for the duration of t, the following output is obtained.

$$\int_0^t L_3 dt = K_4 10^{K_5 \cdot f(L_1)} t$$

Since the duration t during which the integrated output of the integrator 6 becomes equal to the constant $K_6$ given by the constant generator 8 is considered to be the exposure time T determined by the circuit system, the following formula is obtained.

$$T = \frac{K_6}{K_4 \cdot 10^{K_5 \cdot f(L_1)}} = \frac{K_6}{K_4} 10^{-K_5 f(L_1)}$$

The above formula can be represented as $$\log_{10} T = \log_{10} \frac{K_6}{K_4} - K_5 \cdot f(L_1).$$

This formula can be further changed to the following formula by use of said formula (4).

$$\log_{10} T = \log_{10} \frac{K_6}{K_4} - K_5 \cdot f(K_2 \log_{10} K_3 \cdot K_1 \cdot I)$$

Further, by use of said formula (3), the above formula is changed to $$\log_{10} T = \log_{10} \frac{K_6}{K_4} - K_5 f(K_1 \log_{10} K_3 \cdot K_1 \cdot I_0 \cdot 10^{-D})$$

$$= \log_{10} \frac{K_6}{K_4} - K_5 f(K_2 \log_{10} K_3 K_1 I_0 - K_2 D).$$

By use of substitution, $\log_{10}(K_6/K_4) = a$, and $K_2 \log_{10} K_3 K_1 I_0 = b$, the above formula can be represented simply as $$\log_{10} T = a - K_5 f(b - K_2 D). \qquad (6)$$

Thus, it is noted that the relationship of the log of the exposure time $\log_{10} T$ and the density of the negative D is a linear function converted linearly from a function $\log T = f(D)$. By properly selecting the constants as $a = b = 0$, $K_5 = -1$ and $K_2 = -1$, the formula (6) becomes $$\log_{10} T = f(D),$$

which is the same as the function of the conversion of the input-output conversion circuit 4 as defined by said formula (5).

Thus, by use of the formula (6), the function of the conversion conducted by the circuit 4 is properly selected to perform the slope control properly.

Figure 2:
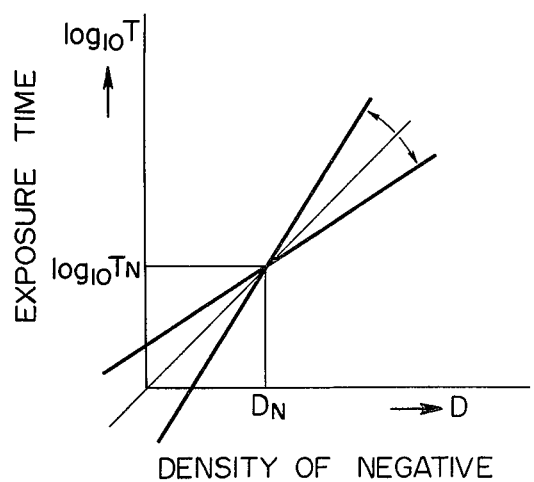
FIG. 2 is a graph showing the relationship between the exposure time in log and the density of negative.
Figure 3:
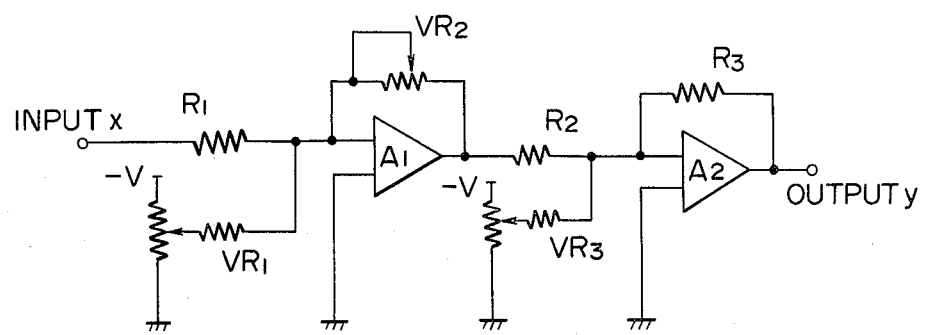
FIG. 3 is a circuit view showing an embodiment of an input-output conversion circuit employed in the electric circuit system which embodies the method of this invention.

One example of the slope control performed by the circuit system embodying the method of this invention will be hereinbelow described with reference to FIGS. 2 and 3. As shown in the graph of FIG. 2, in this example the gradient of a curve in the graph having a scale of the density of negative on the abscissa and a scale of the exposure time on the ordinate is changed about a point ($D_N$, $\log_{10} T_N$). In this case, the input and output of the conversion circuit 4 are represented by $$L_2 = -\frac{S}{K_5}\left\{-\frac{1}{K_2}(L_1 - b) - D_N\right\} + \frac{1}{K_5}(a - \log_{10}T_N) \quad (7)$$

Figure 4:
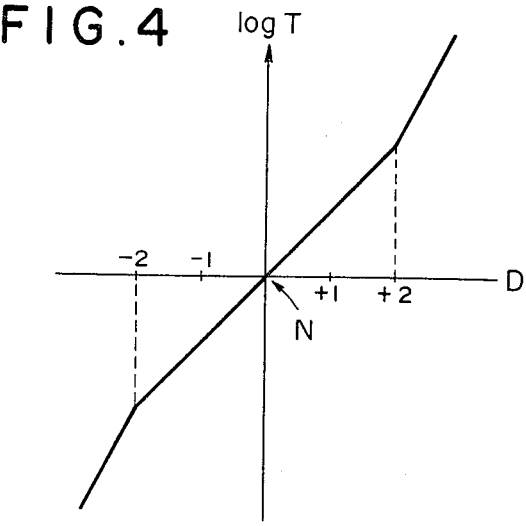
FIG. 4 is a graph showing a desired relationship between the exposure time and the density of negative.

Since when $L_1 = b - K_2 D$, $L_2 = f(b - K_2 D)$, the formula (6) is represented by $$\log_{10} T = S(D - D_N) + \log_{10} T_N \quad (8)$$

and accordingly, the relationship of the log exposure time $\log_{10} T$ and the density of the negative D is represented by a group of lines the gradient of which changes about the point $(D_N, \log_{10} T_N)$ as shown in FIG. 4 by changing the gradient S of the formula (7).

The input-output conversion circuit 4 having the conversion function as the formula (7) in which the output $L_2$ is represented by a linear expression of the input $L_1$ can easily be prepared. One embodiment of the input-output conversion circuit 4 is shown in FIG. 3. For the sake of simplification, the operation of the circuit shown in FIG. 3 will be made by use of a linear expression of $y = A(x - X) + Y$ wherein the input $L_1$ is represented by x and the output $L_2$ by y. Referring to FIG. 3, the input x is added to a constant potential X which is determined by a negative potential $-V$ and a variable resistor $VR_1$ and sent to an amplifier $A_1$ which controls the input-output function (gain A), thereby making an output $-A(x - X)$. The output is added to a constant potential $-Y$ which is determined by a negative potential $-V$ and a variable resistor $VR_3$, thereby making an output $-A(x - X) - Y$. Then, the output is inverted through an inverter $A_2$. Thus, said linear expression $y = A(x - X) + Y$ is obtained.

Figure 5:
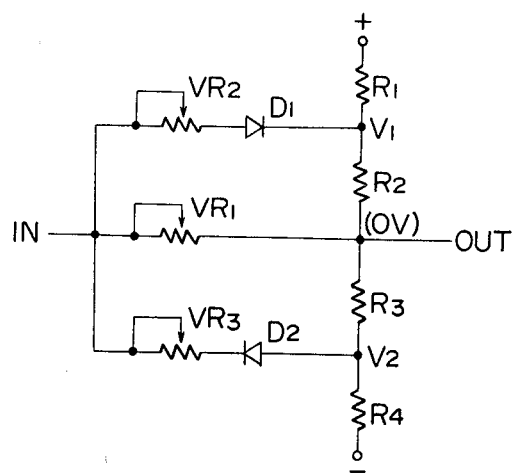
FIG. 5 is a circuit view showing another embodiment of an input-output conversion circuit employed in the electric circuit system which embodies the method of this invention for obtaining the desired relationship as shown in FIG. 4.
Figure 6:
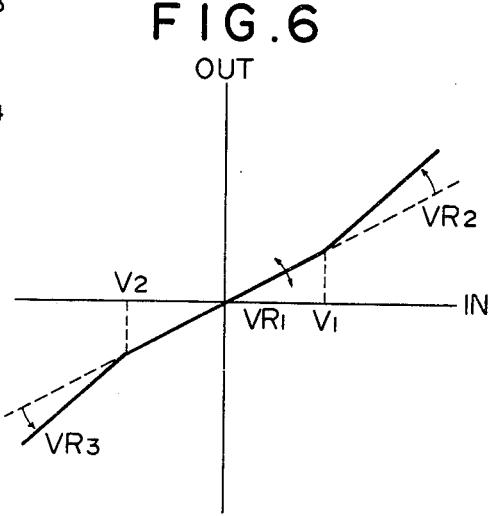
FIG. 6 is a graph showing the relationship between the exposure time and the density of negative obtained by the circuit as shown in FIG. 5.

Further, it is possible to obtain a relationship as shown in FIG. 4 wherein the characteristic curve is bent at the positions where the density is two steps over and under from the standard point. In order to effect such an operation, an input-output conversion circuit as shown in FIG. 5 is employed between the amplifiers 3 and 5. Resistors $R_1$ to $R_4$ are connected in series to divide the voltage applied thereto to obtain potentials $V_1$, 0 volt, and $V_2$ when the circuit is not supplied with an input. By controlling three variable resistors $VR_1$, $VR_2$ and $VR_3$, the relationship between the exposure time and the density of negative is changed as indicated in the graph shown in FIG. 6. The linear characteristic curve shown in FIG. 6 is bent at two positions and the gradients of three sections thereof are changed by controlling the variable resistors $VR_1$, $VR_2$ and $VR_3$ as indicated.

I claim:

1. A method of controlling the exposure time in an automatic color printer for obtaining color prints from color negatives in accordance with a control formula, $\log_{10} T = f(D)$, where T is the controlled exposure time and D is the large area transmission density of the color negative, wherein the conditions of $$\log_{10}(K_6/K_4)K_2 \log_{10} K_3 K_I I_o = 0, \text{ and}$$

$$K_5 = K_2 = -1$$

are satisfied, in which $K_1$, $K_2$, $K_3$, $K_4$, $K_5$, and $K_6$ are preselected constants and $I_o$ is the amount of light incident to the color negative, in which a slope control is performed, the method comprising the steps of:

measuring the amount of light transmitting through the color negative and generating an output indicative of the transmission density of the negative represented by $K_I I_o \cdot 10^{-D}$;

log converting the output based on a conversion function of $y = K_2 \log_{10} K_3 x$, where y is the output of $L_1$ of the log conversion and x is the input thereof, corresponding to said output $K_I I_o 10^{-D}$ indicative of the transmission density;

converting the log converted output to a slope control value based on a conversion function represented by $L_2 = f(L_1)$, where $L_2$ is the slope control value and $L_I$ is the output of the log conversion;

exponentially converting the slope control value $L_2$ based on a conventional function of $y = K_4 10^{K_5 \cdot x}$ where y is the output of the exponential conversion and x is the input thereof corresponding to said input $L_2$, and $K_6$ is said preselected constant;

integrating the exponentially converted slope control value;

comparing the integrated value with a preselected constant; and determining the exposure time of the color printer, when said integrated value has become equal to the preselected constant.

* * * * *